(12) United States Patent
Lee et al.

(10) Patent No.: US 9,235,548 B2
(45) Date of Patent: Jan. 12, 2016

(54) METHOD OF TRANSFERRING CONTENT AND DEVICE USING THE METHOD

(71) Applicant: LG Electronics Inc., Seoul (KR)

(72) Inventors: Seokhee Lee, Seoul (KR); Sungmok Shin, Seoul (KR); Sangho Choi, Gwacheon-Si (KR); Myonggu Lee, Gwacheon-Si (KR); Mikyung Kim, Seoul (KR); Seongpyo Hong, Seongnam-Si (KR); Hyoungrae Kim, Seoul (KR); Sanghyuk Oh, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 293 days.

(21) Appl. No.: 13/679,130

(22) Filed: Nov. 16, 2012

(65) Prior Publication Data

US 2013/0124617 A1    May 16, 2013

(30) Foreign Application Priority Data

Nov. 16, 2011    (KR) .......................... 10-2011-0119651

(51) Int. Cl.
*G06F 15/16* (2006.01)
*H04L 29/08* (2006.01)

(52) U.S. Cl.
CPC ............ *G06F 15/16* (2013.01); *H04L 67/1097* (2013.01)

(58) Field of Classification Search
CPC . H04L 67/306; H04L 65/60; H04L 29/06863; H04L 63/102; H04L 69/18; G06F 17/30038
USPC .................................... 709/203, 223; 348/143
See application file for complete search history.

(56) References Cited

U.S. PATENT DOCUMENTS

| | | | | |
|---|---|---|---|---|
| 8,571,280 | B2 * | 10/2013 | Mathew ................ | G06F 19/321 382/128 |
| 8,584,178 | B2 * | 11/2013 | McCarthy, III .... | H04N 21/2743 386/219 |
| 8,695,053 | B2 * | 4/2014 | Huang ........... | H04N 21/234309 725/110 |
| 8,769,269 | B2 * | 7/2014 | Anglin ..................... | G06F 21/57 707/827 |
| 2001/0051952 | A1 * | 12/2001 | Nakazato ................ | G06F 17/30 |
| 2011/0040607 | A1 * | 2/2011 | Shkedi ................... | G06Q 30/02 705/14.4 |
| 2011/0321118 | A1 * | 12/2011 | Boldyrev ................ | G06F 21/35 726/1 |
| 2012/0072463 | A1 * | 3/2012 | Moganti ............ | G06Q 30/0276 707/803 |
| 2012/0129506 | A1 * | 5/2012 | Kumar .................. | H04W 4/206 455/414.3 |
| 2012/0151404 | A1 * | 6/2012 | Nazmus ................ | G06F 3/0482 715/780 |
| 2013/0070090 | A1 * | 3/2013 | Bufalini .............. | G06F 19/3462 348/143 |

* cited by examiner

*Primary Examiner* — Tesfay Yohannes
(74) *Attorney, Agent, or Firm* — Ked & Associates, LLP

(57) ABSTRACT

According to the present disclosure, there is provided a method of transferring content between a plurality of devices, and devices using the method. The method may include acquiring content at a first device, acquiring tag information associated with the content, adding the tag information to the content, the tag information including identification of a second device as a destination for the content, determining a cloud storage device on a cloud storage network associated with the second device based on the tag information, and transmitting the content to the cloud storage device associated with the second device.

14 Claims, 15 Drawing Sheets

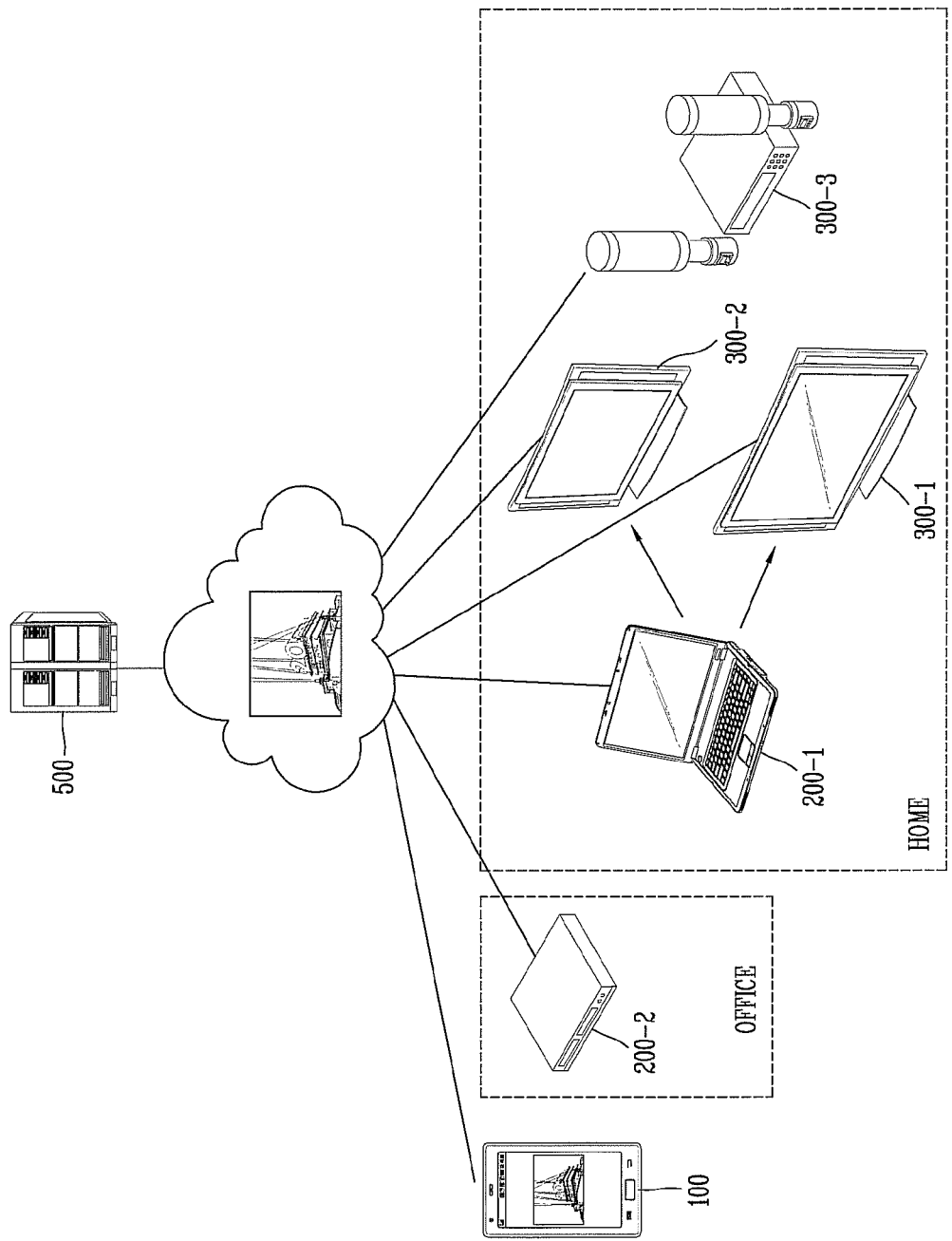

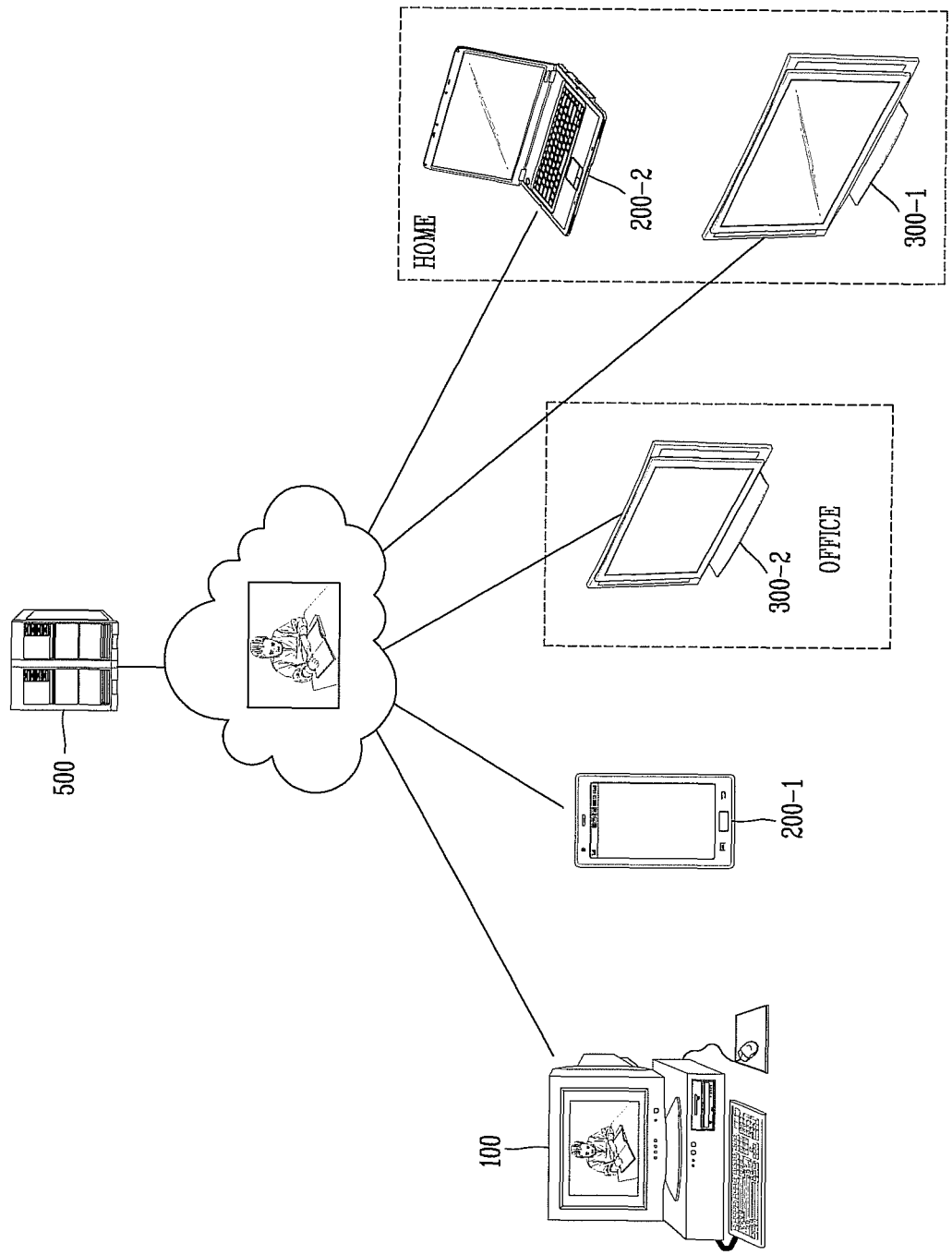

METHOD OF TRANSFERRING CONTENT AND DEVICE USING THE METHOD

CROSS-REFERENCE TO RELATED APPLICATION(S)

This application claims priority under 35 U.S.C. §119 to Korean Application No. 10-2011-0119651 filed in Korea on Nov. 16, 2011, whose entire disclosure is hereby incorporated by reference.

BACKGROUND

1. Field

The present disclosure relates to a method for transferring contents, and devices using the same.

2. Background

Methods for transmitting contents between multiple devices, and devices using the same are known. However, they suffer from various disadvantages.

BRIEF DESCRIPTION OF THE DRAWINGS

The embodiments will be described in detail with reference to the following drawings in which like reference numerals refer to like elements, wherein:

FIG. 6A is a diagram that illustrates one example of a process illustrated in FIG. 4;

FIG. 6B illustrates the example of one process illustrated in FIG. 4;

DETAILED DESCRIPTION

Figure 1:
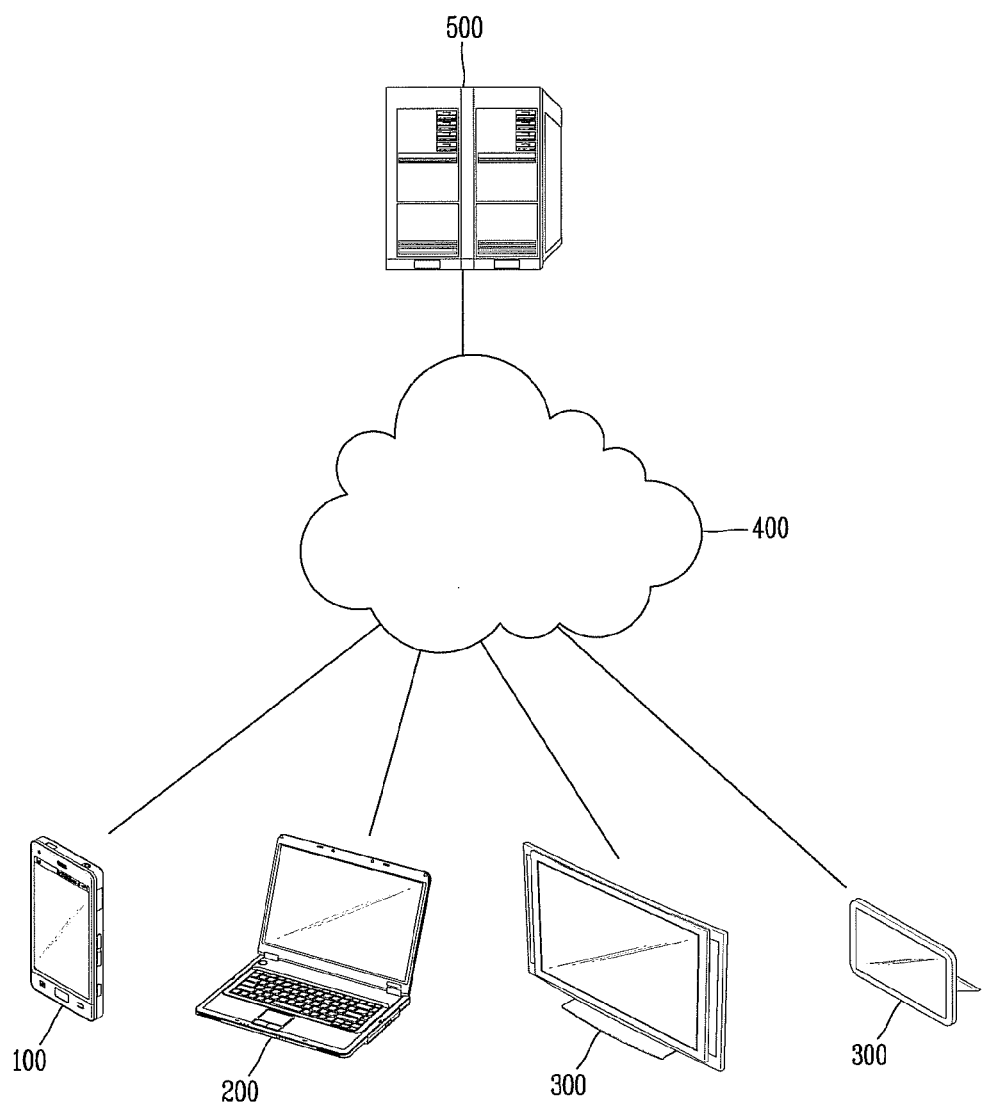
FIG. 1 is a view illustrating a cloud computing system according to an embodiment of the present disclosure.

It should be noted that technological terms used herein are merely used to describe a specific embodiment, but not to limit the present disclosure. Also, unless particularly defined otherwise, technological terms used herein should be construed as a meaning that is generally understood by those having ordinary skill in the art to which the disclosure pertains, and should not be construed too broadly or too narrowly. Furthermore, if technological terms used herein are wrong terms, unable to correctly express the concept of the disclosure, then they should be replaced by technological terms that are properly understood by those skilled in the art. In addition, general terms used in this disclosure should be construed based on the definition of dictionary, or the context, and should not be construed too broadly or too narrowly.

Incidentally, unless clearly used otherwise, expressions in the singular number include a plural meaning. In this application, the terms "comprising" and "including" should not be construed to necessarily include all of the elements or steps disclosed herein, and should be construed not to include some of the elements or steps thereof, or should be construed to further include additional elements or steps.

Furthermore, a suffix "module", "unit", and "portion" used for constituent elements used in the present disclosure is merely intended for easy description of the specification, and the suffix itself does not give any special meaning or function.

Furthermore, in the present disclosure, the terms including an ordinal number such as first, second, etc. can be used to describe various elements, but the elements should not be limited by those terms. The terms are used merely for the purpose to distinguish an element from the other element. For example, a first element may be named to a second element, and similarly, a second element may be named to a first element without departing from the scope of right of the disclosure.

Hereinafter, embodiments of the present disclosure will be described in detail with reference to the accompanying drawings, and the same or similar elements are designated with the same numeral references and redundant description will be omitted.

Moreover, in describing the present disclosure, the detailed description will be omitted when a specific description for publicly known technologies to which the disclosure pertains is judged to obscure the gist of the present disclosure. Also, it should be noted that the accompanying drawings are merely illustrated to easily explain the concept of the disclosure, and therefore, they should not be construed to limit the concept of the disclosure by the accompanying drawings.

In a broad sense, cloud computing represents an Internet based computing technology. In a narrow sense, cloud computing is an Internet based software service in which programs are located in a utility data server on the Internet, but downloaded and used in a computer or mobile phone whenever they are required. Institute of Electrical and Electronics Engineers (IEEE) defines cloud computing as a paradigm that information is permanently stored in a server on the Internet but is temporarily stored in a client such as a desktop or table computer, a notebook, a wall mounted computer, a portable device, or the like.

In a cloud computing environment, software (control codes) and data are stored in a server. Furthermore, when data is required, a client may access the server to acquire data. However, when a network state between the client and the server is congested, the client's access to the server to receive data may cause inconvenience to the user. In other words, when the client receives data through the server each time, transmission delay may occur according to circumstances. Accordingly, even when a network state between the client and the server is congested or otherwise limited, there is the necessity of introducing a method of allowing the client to quickly acquire data.

Furthermore, though storage capacity may be provided by a cloud server to a user, the capacity may be insufficient for the user or his growing needs. As a result, there is the necessity of introducing a method of using the storage space of personal devices on behalf of a cloud server, in addition to the capacity provided by the cloud server.

Accordingly, an objective of the present disclosure is to provide schemes for solving the foregoing problems. Provided is a scheme for using the storage space of personal devices on behalf of a cloud server, in addition to the capacity provided by the cloud server. Furthermore, provided is a scheme for allowing a client to quickly acquire data contained in a cloud storage even when a network state between the client and the server is not so good. Furthermore, provided is a scheme for performing an additional function in a personal device when its contents are shared.

FIG. 1 is a view illustrating a cloud computing system according to an embodiment of the present disclosure. A cloud computing system may include devices 100, 200, 300, and a server 500. The server 500 and devices 100, 200, 300 may be connected to one another via a network 400.

The server 500 may provide cloud storage to stored content for devices 100, 200, and 300. The content may include a video file, an image file, a sound file, other data files, and the like.

Simply for ease of description, the devices 100, 200, 300 may be classified into a first device 100 (first device type), a second device 200 (second device type), and a third device 300 (third device type) according to the role performed in a cloud system. A device for providing a content to be stored in a cloud storage may be defined as a first device 100. Furthermore, a device for storing the content on behalf of a cloud storage server may be defined as a second device 200. In addition, a device for receiving content from the second device 200 may be defined as a third device 300.

When the devices 100, 200, 300 perform predetermined functions, respectively, the foregoing classification may be implemented according to the performed function. Accordingly, the devices 100, 200, 300 may become a first device, or may become a second device, or may become a third device according to the function performed by the devices 100, 200, 300.

The first, the second, and the third device 100, 200, 300 disclosed in the present disclosure may include a portable electronic device, a stationary terminal, and the like. Furthermore, a portable electronic device disclosed herein may include a portable phone, a smart phone, a laptop computer, a digital broadcast terminal, personal digital assistants (PDAs), a portable multimedia player (PMP), a navigation device, and the like. Also, a stationary terminal disclosed herein may include a digital TV, a digital picture frame, a desktop computer, and the like.

A space in which a predetermined content is stored within a cloud system may be defined as a cloud storage (cloud storage network). For instance, the cloud storage server and the second device 200 may be commonly referred to as a cloud storage.

Hereinafter, constituent elements of a cloud storage server 500 that can be used in an embodiment of the present disclosure will be described in detail.

Figure 2:
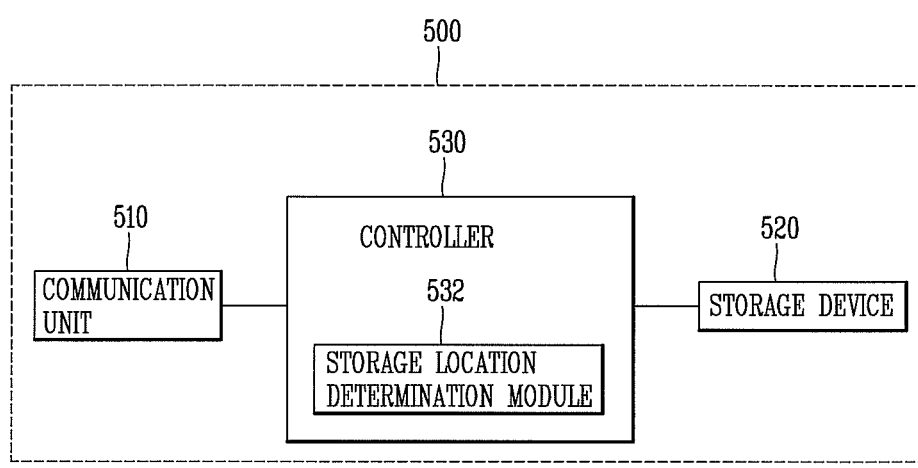
FIG. 2 is a block diagram illustrating a cloud storage server according to an embodiment disclosed in the present disclosure.

FIG. 2 is a block diagram illustrating a cloud storage server 500 according to an embodiment disclosed in the present disclosure. The cloud storage server 500 may control the entire operation of content storage within a cloud system.

The cloud storage server 500 may include a communication device 510, a storage device 520, and a controller 530. However, the constituent elements as illustrated in FIG. 2 are not necessarily required, and the server 500 may be implemented with greater or less number of elements than those illustrated elements.

The communication device 510 may perform a function for allowing communication between the cloud storage server 500 and the network 400. The storage device 520 may store at least part of a content that should be stored in a cloud system. Furthermore, when a content is dispersed to be stored in devices included in a cloud storage, the storage device 520 may store information on devices in which the content is stored. The controller 530 may typically control the entire operation of the cloud storage server 500.

Meanwhile, in a cloud system according to an embodiment of the present disclosure, a content that should be stored in the cloud system may be also stored in a second device 200 other than the cloud storage server 500. In this case, a storage location determination module 532 included in the controller 530 may determine the storage location of the content. For instance, the storage location determination module 532 may determine a second device 200, which is most suitable to store the content, among arbitrary second devices 200 capable of storing the content on behalf of the cloud storage server. In this case, the determination may be carried out based on a user context and content information.

In this embodiment, a user context may denote information indicating the state of entity such as a user, a place, an object and the like, which may be required for an interaction between the user and application services. In other words, when the storage location determination module 532 determines a second device for storing the content on behalf of the cloud storage server 500, all information that can be considered to determine the second device can be defined as a user context to allow a third device to most effectively use the content.

For instance, when determining a second device, a device capable of most easily performing transmission to a third device may be determined as the second device. In this case, a network state between the second device and the third device may be taken into consideration, and the network state information may be included in the user context.

Furthermore, when determining a second device, a device that can perform near field communication (NFC) with a third device may be determined as the second device. In this case, near field communication between the second device and the third device should be allowed, and thus the location of each device may be contained in the user context.

Furthermore, when a user has a regular life pattern (e.g., historical behavior, habits, schedule) a suitable device capable of storing the content may be determined according to the time of storing the content. In this case, a user's living pattern and a content store time may be contained in the user context. For instance, in case of a user who leaves office at a predetermined time, and mostly views a video file using a portable electronic device during his commute, the foregoing living pattern may be taken into consideration.

When a predetermined content is acquired from the first device at a time prior to leaving office, a part of the content may be preferably directly transmitted to the second device, and the remaining part thereof may be transmitted to a device located at home or the cloud storage server 500. In this case, only a portion of the whole content that can be viewed during the commute may be transmitted to the second device, and the remaining content may be transmitted to a predetermined location within the cloud storage, thereby allowing the user to view the content with a portable electronic device, and view the content with the third device using the cloud storage after arriving home from work.

Furthermore, when determining a second device, a third device for receiving the content from the second device should be taken into consideration, and thus information on the kinds of devices or number of devices used by the user within the cloud system may be contained in the user context.

The content information may denote various information associated with a content. The content information may include a content format, a content title, content tag information, content reproduction information, and the like. For instance, when the storage location determination module 532 determines a second device for storing the content, the second device may be preferably determined by considering a third device capable of reproducing the content. Accordingly, a content format may be considered during the determination of the storage location determination module 532 to provide criteria for determining whether the third device can provide the content.

Furthermore, when the storage location determination module 532 determines a second device for storing the content, the third device may be determined based on the data contained in the content. In other words, a third device capable of mostly reproducing the content may be predicted based on the data contained in the content. Accordingly, during the determination of the storage location determination module 532, a content title, content tag information, and the like may be taken into consideration.

The content tag information may include a content producer, a content play time, and the like. Furthermore, when the content is a series, the content tag information may include information on which episode of the series to which the content corresponds.

Furthermore, the content tag information may include a target device of the content. The target device is a device to which the content is hoped to be transmitted. Using content tag information, a predetermined content may be designated to be transmitted to a predetermined device according to the user's need. Furthermore, the content may be designated to be operated within a predetermined function using the content tag information. Information required for the foregoing operation may be contained in the content tag information. The content reproduction information may include whether the content was previously viewed, a play time and a location for resuming playback in case where the content has been reproduced, or the like.

In this manner, the storage location determination module 532 may determine a second device for storing the content on behalf of the cloud storage server 500 based on a user context and content information.

Hereinafter, the constituent elements of devices 100, 200, 300 that can be used in an embodiment of the present disclosure will be described in detail.

Figure 3:
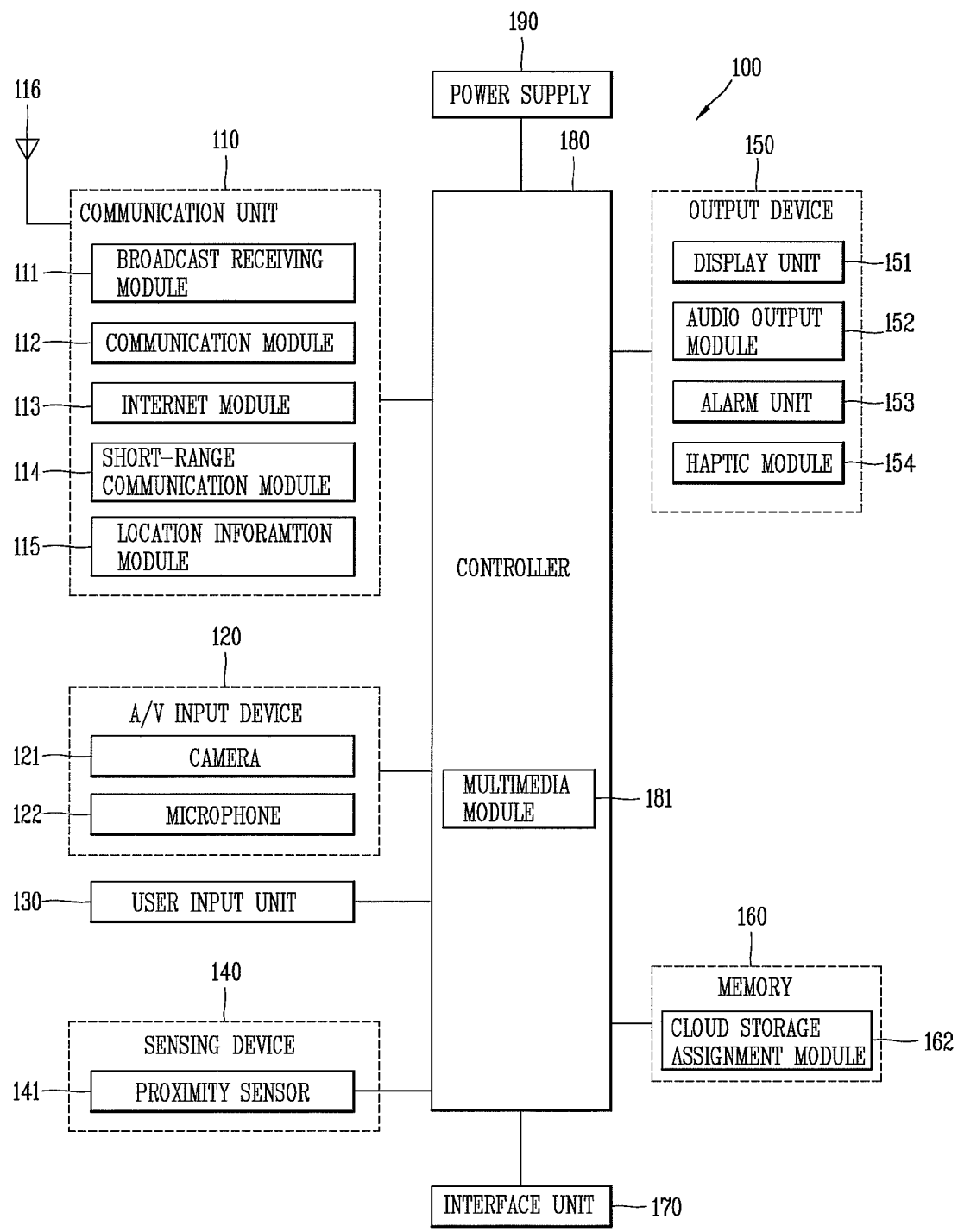
FIG. 3 is a block diagram illustrating a first device according to an embodiment disclosed in the present disclosure.

FIG. 3 is a block diagram illustrating a first device 100 according to an embodiment disclosed in the present disclosure. The foregoing configuration according to an embodiment disclosed in the present disclosure may be also applicable to a second device, a third device, and the like, in a similar manner.

Meanwhile, according to a disclosure of the present disclosure, it is described assuming that the first device 100 is a portable electronic device. However, it would be easily understood by those skilled in the art that the configuration according to a disclosure of the present disclosure may be applicable to a stationary terminal, and the like, excluding constituent elements particularly applicable to a portable electronic device.

The first device 100 may include a communication unit 110, an audio/video (NV) input device 120, a user input device 130, a sensing device 140, an output device 150, a memory 160, an interface device 170, a controller 180, a power supply device 190, and the like. However, the constituent elements as illustrated in FIG. 3 are not necessarily required, and the first device may be implemented with greater or less number of elements than those illustrated elements.

The communication unit 110 may include one or more elements allowing communication between the first device 100 and a communication system, or allowing communication between the first device 100 and a network in which the first device 100 is located. For example, the communication unit 110 may include a broadcast receiving module 111, a communication module 112, an Internet module 113, a short-range communication module 114, a location information module 115, and the like.

The broadcast receiving module 111 receives broadcast signals and/or broadcast associated information from an external broadcast management server through a broadcast channel. The broadcast channel may include a satellite channel and/or a terrestrial channel. The broadcast management server may mean a server that generates and transmits a broadcast signal and/or broadcast associated information or a server that receives a previously generated broadcast signal and/or broadcast associated information and transmits to the device. The broadcast signal may include a TV broadcast signal, a radio broadcast signal and a data broadcast signal as well as a broadcast signal in a form that a data broadcast signal is combined with the TV broadcast signal or radio broadcast signal.

The broadcast associated information may mean information regarding a broadcast channel, a broadcast program, a broadcast service provider, and the like. The broadcast associated information may also be provided through a mobile communication network. In this case, the broadcast associated information may be received by the mobile communication module 112.

The broadcast associated information may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may receive a digital broadcast signal using a digital broadcast system such as digital multimedia broadcasting-terrestrial (DMB-T), digital multimedia broadcasting-satellite (DMB-S), media forward link only (MediaFLO), digital video broadcast-handheld (DVB-H), integrated services digital broadcast-terrestrial (ISDB-T), and the like. The broadcast receiving module 111 is, of course, configured to be suitable for every broadcast system as well as the above-mentioned digital broadcast systems.

The broadcast signal and/or broadcast-associated information received through the broadcast receiving module 111 may be stored in the memory 160.

The communication module 112 may transmit and/or receive a radio signal to and/or from at least one of a base station, an external terminal and a server over a communication network. Here, the radio signal may include a voice call signal, a video call signal and/or various types of data according to text and/or multimedia message transmission and/or reception.

The communication module 112 may be configured to implement a video communication mode and a voice communication mode. The video communication mode refers to a configuration in which communication is made while viewing the image of the counterpart, and the voice communication mode refers to a configuration in which communication is made without viewing the image of the counterpart. The communication module 112 may be configured to transmit or receive at least one of voice or image data to implement the video communication mode and voice communication mode.

The Internet module 113 means a module for supporting Internet access. The Internet module 113 may be built-in or externally installed to the first device 100.

The short-range communication module 114 is a module for supporting a short-range communication. Here, it may be used a short-range communication technology including Bluetooth, Radio Frequency IDentification (RFID), Infrared Data Association (IrDA), Ultra WideBand (UWB), ZigBee, and the like.

The location information module 115 is a module for acquiring a location of the first device, and there is a Global Positioning System (GPS) module as a representative example.

Referring to FIG. 3, the A/V (audio/video) input device 120 may receive an audio or video signal, and the A/V (audio/video) input device 120 may include a camera 121 and a microphone 122. The camera 121 may process an image frame, such as still picture or video, obtained by an image sensor in a video phone call or image capturing mode. The processed image frame may be displayed on a display unit 151.

The image frames processed by the camera 121 may be stored in the memory 160 or transmitted to an external device through the wireless communication unit 110. Two or more cameras 121 may be provided according to the use environment of the mobile device.

The microphone 122 may receive an external audio signal through a microphone in a phone call mode, a recording mode, a voice recognition mode, and the like, and may process the audio signal into electrical voice data. The processed voice data may be converted and outputted into a format that is transmittable to a mobile communication base station through the mobile communication module 112 in the phone call mode. The microphone 122 may implement various types of noise cancelling algorithms to cancel noise generated in a procedure of receiving the external audio signal.

The user input device 130 may generate input data to control an operation of the terminal 100. The user input device 130 may be configured by including a keypad, a dome switch, a touch pad (pressure/capacitance), a jog wheel, a jog switch, and the like.

The sensing device 140 may detect a current status of the first device 100 such as an opened or closed state of the first device 100, a location of the first device 100, presence or absence of the user's contact, an orientation/direction of the first device, acceleration/deceleration of the first device, and the like, and generates a sensing signal for controlling the operation of the first device 100. For example, when the first device 100 is a slide phone type, it may sense an opened or closed state of the slide phone. Furthermore, when performing access to another device based on the direction of a device, the sensing device 140 may sense the direction information of the first device 100 to directly use the direction information or transmit the direction information to another device. Furthermore, the sensing device 140 takes charge of a sensing function associated with whether or not power is supplied from the power supply device 190, or whether or not an external device is coupled to the interface device 170. Meanwhile, the sensing device 140 may include a proximity sensor 141.

The output device 150 is configured to provide an output for audio signal, video signal, or alarm signal, and the output device 150 may include the display unit 151, an audio output module 152, an alarm unit 153, a haptic module 154, and the like.

The display unit 151 may output information processed in the first device 100. For example, when the first device is in a phone call mode, the display unit 151 may display a User Interface (UI) or a Graphic User Interface (GUI) associated with a call. When the first device 100 is in a video call mode or image capturing mode, the display unit 151 may display a captured image and/or received image, a UI or GUI.

The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, and an e-ink display.

Some of those displays may be configured with a transparent or optical transparent type to allow viewing of the exterior through the display unit, which may be called transparent displays. An example of the typical transparent displays may include a transparent LCD (TOLED), or the like. Under this configuration, a user can view an object positioned at a rear side of a mobile device body through a region occupied by the display unit 151 of the mobile device body.

Two or more display units 151 may be implemented according to a configured aspect of the first device 100. For instance, a plurality of the display units 151 may be arranged on one surface to be spaced apart from or integrated with each other, or may be arranged on different surfaces.

When the display unit 151 and a touch sensitive sensor (hereinafter, referred to as a "touch sensor") have an inter-layer structure (hereinafter, referred to as a "touch screen"), the display unit 151 may be used as an input device rather than an output device. The touch sensor may be implemented as a touch film, a touch sheet, a touch pad, and the like.

The touch sensor may be configured to convert changes of a pressure applied to a specific part of the display unit 151, or a capacitance occurring from a specific part of the display unit 151, into electric input signals. Also, the touch sensor may be configured to sense not only a touched position and a touched area, but also a touch pressure.

When there is a touch input to the touch sensor, the corresponding signals are transmitted to a touch controller. The touch controller processes the received signals, and then transmits corresponding data to the controller 180. Accordingly, the controller 180 may sense which region of the display unit 151 has been touched.

Referring to FIG. 3, a proximity sensor 141 may be arranged at an inner region of the first device covered by the touch screen, or near the touch screen. The proximity sensor indicates a sensor to sense presence or absence of an object approaching to a surface to be sensed, or an object disposed near a surface to be sensed, by using an electromagnetic field or infrared rays without a mechanical contact. The proximity sensor has a longer lifespan and a more enhanced utility than a contact sensor.

The proximity sensor may include an optical transmission type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, proximity of a pointer to the touch screen is sensed by changes of an electromagnetic field. In this case, the touch screen (touch sensor) may be categorized into a proximity sensor.

Hereinafter, for the sake of convenience of brief explanation, a status that the pointer is positioned to be proximate onto the touch screen without contact will be referred to as 'proximity touch', whereas a status that the pointer substantially comes in contact with the touch screen will be referred to as 'contact touch'. For the position corresponding to the proximity touch of the pointer on the touch screen, such position corresponds to a position where the pointer faces perpendicular to the touch screen upon the proximity touch of the pointer.

The proximity sensor senses proximity touch, and proximity touch patterns (e.g., distance, direction, speed, time, position, moving status, etc.). Information relating to the sensed proximity touch and the sensed proximity touch patterns may be output onto the touch screen.

The audio output module 152 may output audio data received from the wireless communication unit 110 or stored in the memory 160, in a call-receiving mode, a call-placing mode, a recording mode, a voice recognition mode, a broadcast reception mode, and so on. The audio output module 152 may output audio signals relating to functions performed in the first device 100, e.g., sound alarming a call received or a message received, and so on. The audio output module 152 may include a receiver, a speaker, a buzzer, and so on.

The alarm 153 may output signals notifying occurrence of events from the first device 100. The events occurring from the first device may include call received, message received, key signal input, touch input, and so on. The alarm 153 may output not only video or audio signals, but also other types of signals such as signals notifying occurrence of events in a vibration manner. Since the video or audio signals can be output through the display unit 151 or the audio output device 152, the display unit 151 and the audio output module 152 may be categorized into a part of the alarm 153.

The haptic module 154 generates various tactile effects which a user can feel. A representative example of the tactile effects generated by the haptic module 154 includes vibration. Vibration generated by the haptic module 154 may have a controllable intensity, a controllable pattern, and so on. For instance, different vibration may be output in a synthesized manner or in a sequential manner.

The haptic module 154 may generate various tactile effects, including not only vibration, but also arrangement of pins vertically moving with respect to a skin being touched, air injection force or air suction force through an injection hole or a suction hole, touch by a skin surface, presence or absence of contact with an electrode, effects by stimulus such as an electrostatic force, reproduction of cold or hot feeling using a heat absorbing device or a heat emitting device, and the like.

The haptic module 154 may be configured to transmit tactile effects through a user's direct contact, or a user's muscular sense using a finger or a hand. The haptic module 154 may be implemented in two or more in number according to the configuration of the first device 100.

The memory 160 may store a program for processing and controlling the controller 180. Alternatively, the memory 160 may temporarily store input/output data (e.g., phonebook data, messages, audios, still images, videos, and the like). Also, the memory 160 may store data related to various patterns of vibrations and sounds outputted upon the touch input on the touch screen.

The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and the like. Also, the first device 100 may operate a web storage which performs the storage function of the memory 160 on the Internet.

The memory 160 may include a cloud storage assignment unit 162. When the device performs a function of the second device, the cloud storage assignment unit 162 may store a content provided from the first device 100 on behalf of the cloud storage server. In this manner, when the device performs a function of the second device, a content required by the third device can be quickly searched by the cloud storage assignment unit 162 as the cloud storage assignment unit 162 is included in the memory 160. It is because the device is not required to search the whole memory 160 in order to search the content required by the third device.

The interface device 170 may generally be implemented to interface the first device 100 with external devices. The interface device 170 may allow a data reception from an external device, a power delivery to each component in the first device 100, or a data transmission from the first device 100 to an external device. The interface device 170 may include, for example, wired/wireless headset ports, external charger ports, wired/wireless data ports, memory card ports, ports for coupling devices having an identification module, audio Input/Output (I/O) ports, video I/O ports, earphone ports, and the like.

The identification module may be configured as a chip for storing various information required to authenticate an authority to use the first device 100, which may include a User Identity Module (UIM), a Subscriber Identity Module (SIM), and the like. Also, the device having the identification module (hereinafter, referred to as "identification device") may be implemented in a type of smart card. Hence, the identification device can be coupled to the first device 100 via a port.

Also, the interface device 170 may serve as a path for power to be supplied from an external cradle to the first device 100 when the first device 100 is connected to the external cradle or as a path for transferring various command signals inputted from the cradle by a user to the first device 100. Such various command signals or power inputted from the cradle may operate as signals for recognizing that the mobile device has accurately been mounted to the cradle.

The controller 180 typically controls the overall operations of the first device 100. For example, the controller 180 performs the control and processing associated with telephony calls, data communications, video calls, and the like. Furthermore, the controller 180 may include a multimedia module 181 which provides multimedia playback. The multimedia module 181 may be configured as part of the controller 180 or as a separate component.

Furthermore, the controller 180 can perform a pattern recognition processing so as to recognize writing or drawing input on the touch screen as text or image. The power supply device 190 receives external power and internal power under the control of the controller 180 to provide power required for the operation of various components. Furthermore, the controller 180 may detect data corresponding to an object selected by the user among one or more objects displayed on the display unit 151. Furthermore, the controller 180 may detect a signal input to an object selected by the user.

Here, an object, which is a target on which the user's intention or action is exerted, may be an image, a video file, an icon, a sound, a data file, an email, an SNS bulletin board, a memo, a content of incoming or outgoing phone calls or instant messages, and the like. Furthermore, there may exist various kinds of objects in addition to the foregoing examples.

Furthermore, the controller may interpret content tag information contained in a content received by the device. For instance, when information on a target device of the content is contained in the content tag information, the controller may control the content to be transmitted to the target device. Furthermore, when information for allowing the content to perform a predetermined function in the target device is contained in the content tag information, the controller of the target device may control the content to be used while performing the predetermined function.

Hereinafter, referring to FIG. 4, a specific embodiment of the process of transmitting data from a first device to a second device will be described.

Figure 4:
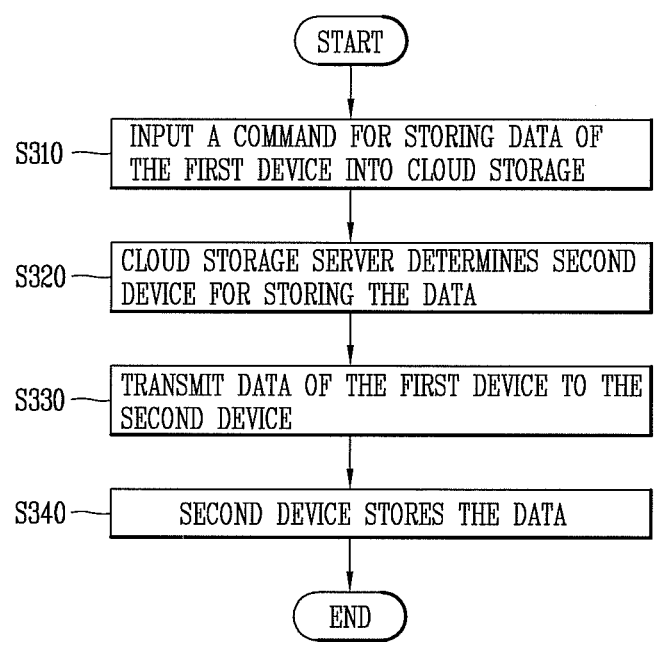
FIG. 4 is a flow chart of a method of transmitting content from a first device to a second device according to an embodiment of the present disclosure.

FIG. 4 is a flow chart illustrating a content transmission method from a first device to a second device according to an embodiment of the present disclosure. The first device may be a first device type and the second device may be a second device type. A command for storing an arbitrary content of the first device into a cloud storage can be input, in step S310. The cloud storage server may determine a second device for storing the data, in step S320. The first device may transmit the data to the second device on the cloud storage network, in step S330. The second device may store the received content in a memory for later access over the cloud storage network, in step S340.

Figure 5:
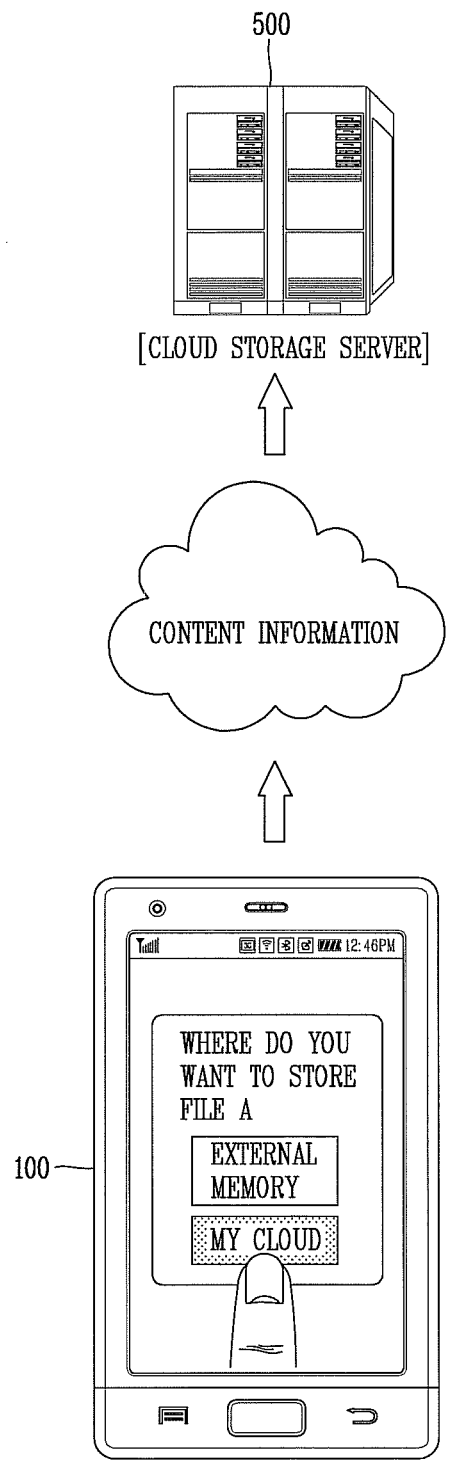
FIG. 5 is a view illustrating one example of a process illustrated in FIG. 4.

Hereinafter, a specific embodiment of one process (S310) illustrated in FIG. 4 will be described with reference to FIG. 5. FIG. 5 is a diagram illustrating one example of a process, step S310 of FIG. 4. When the first device 100 acquires a file A, the file A can be stored. In this case, the first device 100 may store the file A into an external memory, an internal memory, a cloud storage, and the like. When the user inputs a command for storing the file A into a cloud storage, as illustrated in FIG. 5, the first device 100 may transmit content information on the file A to the cloud storage server 500. Otherwise, the first'device 100 may transmit the file A to the cloud storage server 500.

Meanwhile, the cloud storage server 500 may determine a second device for storing the content based on the content information, in step S320 of FIG. 4. For instance, the cloud storage server 500 may determine a device capable of most easily performing transmission to a third device to be the second device.

Hereinafter, a method of allowing the cloud storage server 500 to determine a second device will be described with reference to FIG. 6.

FIG. 6A is a diagram that illustrates one example of a process (S320) illustrated in FIG. 4. The first device 100 may acquire, for example, a movie content which may be stored in the cloud storage. The cloud storage server 500 may acquire content information from the first device 100. Then, the cloud storage server 500 may determine a second device based on the content information and a user context.

In this embodiment, the method of determining a second device assuming that there exist three third devices (300-1, 300-2, 300-3), which are mostly used by the user, and two second devices 200-1, 200-2, which can be used as a second device, will be described.

The content information may include information indicating that the format of the content is a video file, information indicating that the content is a movie file, and the like. Furthermore, it is assumed that the user context includes information indicating that the user mostly views a movie content at home.

In this embodiment, a third device capable of reproducing the content may include the third devices 300-1, 300-2 having a display. On the basis of the content format information, the third devices 300-1, 300-2 can reproduce the content, but the third device 300-3 cannot reproduce the content. Accordingly, during the process of determining a second device, the second device can be determined without taking the third device 300-3 into consideration.

In this case, a second device capable of easily performing data transmission to the third devices 300-1, 300-2 may be determined as the second device for storing the content. Accordingly, among the second devices 200-1, 200-2 that can be used by the user, a second device capable of easily performing data transmission to the third devices 300-1, 300-2 should be determined as the second device for storing the content.

Referring to FIG. 6A, the second device 200-1 may be located in the same space as the third devices 300-1, 300-2. However, the second device 200-2 is not located in the same space as the third devices 300-1, 300-2. Accordingly, the second device 200-1 capable of performing near field communication with the third devices 300-1, 300-2 may be determined as a second device for storing the content. In this manner, it may be possible to determine the storage location of an arbitrary content that should be stored in a cloud storage.

FIG. 6B is a diagram that illustrates one example of a process (S320) illustrated in FIG. 4. The first device 100 may acquire an education content to store the file into the cloud storage. The cloud storage server 500 may acquire content information from the first device 100. Then, the cloud storage server 500 may determine a second device based on the content information and a user context.

In this embodiment, the method of determining a second device assuming that there exist three third devices (300-1, 300-2, 300-3), which are mostly used by the user, and two second devices 200-1, 200-2, which can be used as a second device, will be described.

The content information may include information indicating that the format of the content is a video file, information indicating that the content is an education file, and the like. Furthermore, it is assumed that the user context includes information indicating that the user always views an education content regardless of location (e.g., home, office, or traveling).

In this embodiment, the user may access the content regardless of his location. Accordingly, during the process of determining a second device, it should be considered that both of the third devices 300-1 and 300-2 can access the content to reproduce the content. Also, it should be considered that the user can access the content to reproduce it even while the user is moving.

Referring to FIG. 6B, the user can always carry the second device 200-1. Accordingly, as the user moves, the second device 200-1 can perform near field communication with the third devices 300-1, 300-2. However, the second device 200-2 may likely not be carried by the user, and near field communication with both the third devices 300-1, 300-2 is disabled.

As a result, among the second devices 200-1, 200-2 that can be used by the user, the second device capable of easily performing data transmission to the third devices 300-1, 300-2 as well as being carried by the user should be determined as a second device for storing the content. In this manner, it may be possible to determine the storage location of an arbitrary content that should be stored in a cloud storage.

The foregoing method is an example of the methods of determining a second device for storing a content by taking a user context and content information into consideration. As a result, a second device may be determined based on a user context and content information using various methods according to the need.

Figure 7A:
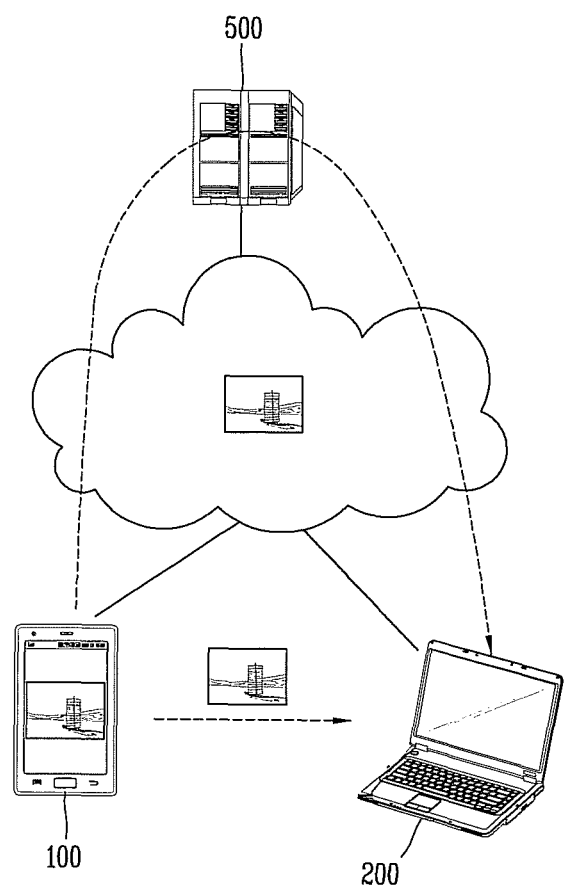
FIG. 7A is a diagram that illustrates one example of a process illustrated in FIG. 4.

FIG. 7A is a diagram that illustrates one example of a process (S330) illustrated in FIG. 4. An arbitrary content contained in the first device 100 may be transmitted to the second device 200. In this case, the first device 100 may transmit the content to the cloud storage server 500. Furthermore, the cloud storage server 500 may transmit the content to the second device 200. In other words, the second device 200 may receive the content by way of the cloud storage server 500. In this case, the content may be backed up in the cloud storage server 500. In other words, to cope with circumstances such as a network failure, or the like, the content may be backed up in the cloud storage server 500. Accordingly, when the content is received, the content can be backed up.

Meanwhile, when direct communication is enabled between the first device 100 and the second device 200, the first device 100 can directly transmit a content designated for storage in the second device 200 to the second device 200. When the second device 200 directly receives the content from the first device 100, the second device 200 may transmit the content to the cloud storage server 500 to back up the content. The cloud storage server 500 may receive the content to use it for backup.

Meanwhile, when the content is transmitted to the second device 200, there may occur a case where the power of the second device is turned off. In this case, if the second device 200 supports a wake-on-LAN function, then the power of the second device may be turned on through a network, and then the content may be transmitted to the second device 200. Otherwise, the content may be stored on the cloud storage server 500, and then the content may be transmitted to the second device 200 once the second device 200 is powered on.

Figure 7B:
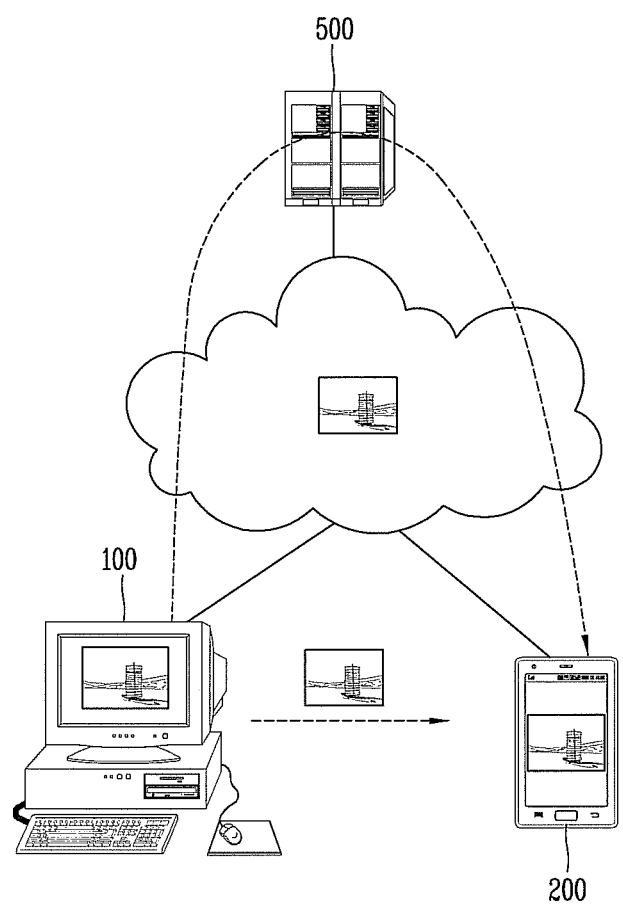
FIG. 7B is a diagram that illustrates one example of a process illustrated in FIG. 4.

FIG. 7B is a diagram that illustrates one example of a process (S330) illustrated in FIG. 4. An arbitrary content contained in the first device 100 may be transmitted to the second device 200. Even when the second device 200 is a portable electronic device, the foregoing content transmission method will be applicable as it is.

However, as a portable electronic device may have a relatively low storage capacity, there may occur a case where the storage space is insufficient when storing the content. In this case, the storage can be secured by moving certain content stored in the cloud storage assignment module 162 of the portable electronic device to the cloud storage server 500, another second device 200, or the like.

In this case, the content to be moved from the portable electronic device 200 for remote storage may be determined based on content information. Here, content likely to be accessed may be stored on the portable electronic device 200 while content unlikely to be accessed may be moved to the cloud storage server 500, another second device 200, or the like for long-term storage.

For instance, in case of a content for which information indicating that the content has been previously reproduced is contained in the content information, it may be moved prior to other contents. It is because, based on the content access history, for example, if the content has been previously accessed, the likelihood of reproducing it again is low.

Furthermore, in a case where content stored is part of a series, a content for an episode located at the front part of the series may be moved prior to other episodes located at the rear part of the series. The later episodes of the series may have a higher probability of being access after the front part of the series are accessed.

Furthermore, a content that has been partially viewed by the user may have a higher probability of being to be viewed again by the user, and therefore, a content that has not been viewed even once may be moved over content that has been partially viewed.

Other than the foregoing methods, the storage space of a portable electronic device can be secured by various methods using content information according to need.

Figure 8:
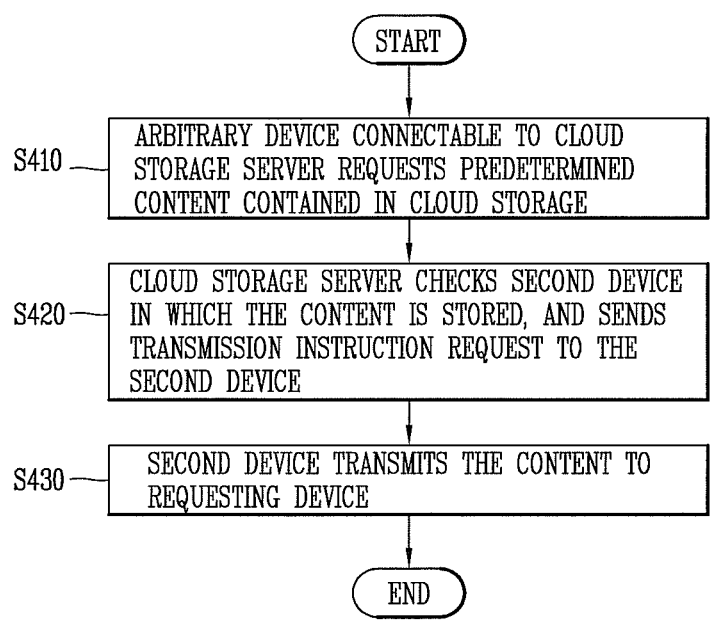
FIG. 8 is a flow chart of a method of transferring content a device to a requesting device according to an embodiment of the present disclosure.

FIG. 8 is a flow chart of a method of transferring content a device to a requesting device according to an embodiment of the present disclosure. The sending device may be a first device type 100 and the requesting device may be a third device type 300. An arbitrary device (third device type) that can be connected to the cloud storage server 500 may send a request for transmitting a predetermined content contained in the cloud storage, in step S410.

The cloud storage server 500 may include content information stored in the cloud storage and location information for which the content is stored. For instance, the information may be stored in the storage device 520 within the cloud storage server 500.

Figure 9:
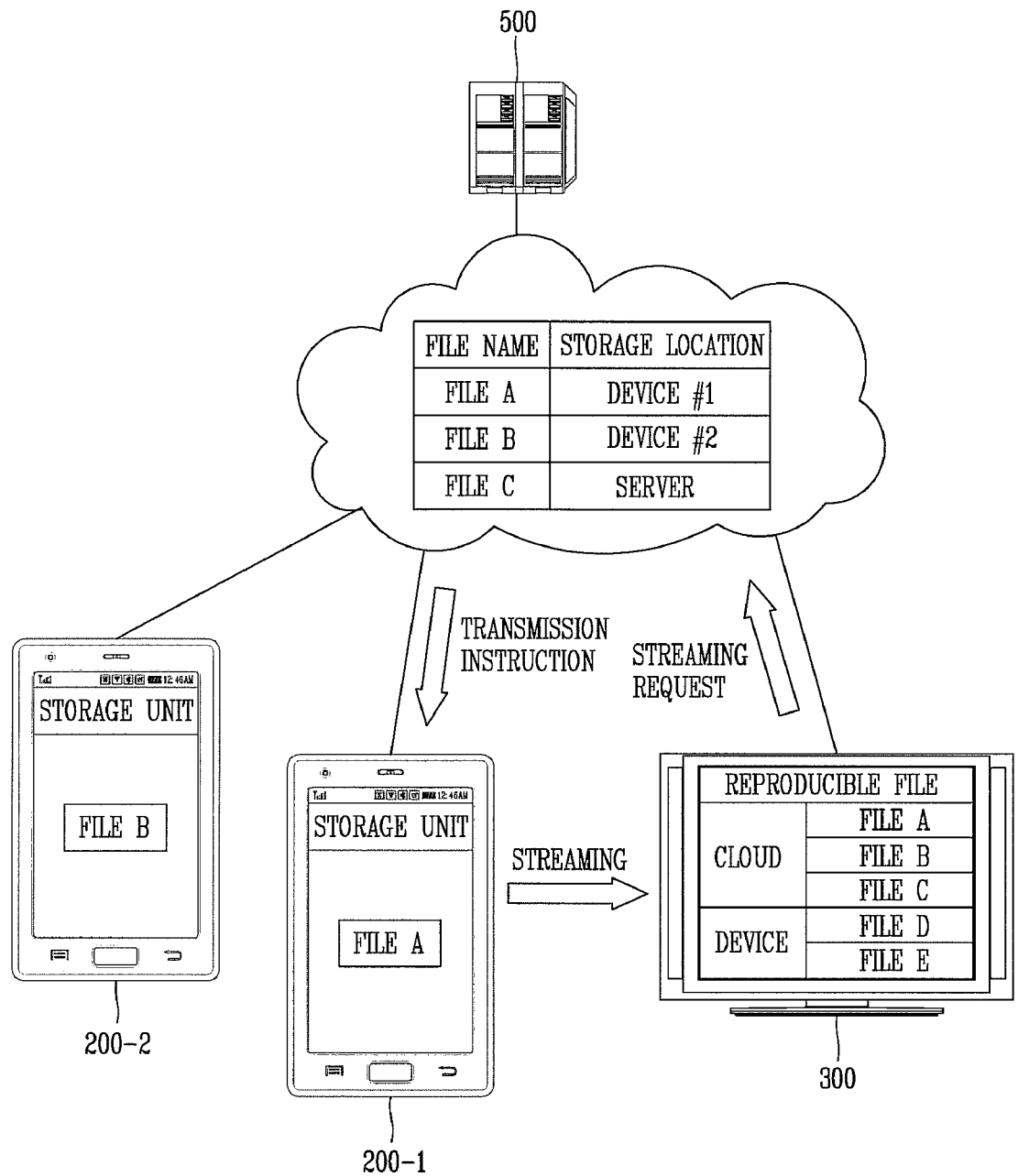
FIG. 9 is a diagram illustrating one example of a process illustrated in FIG. 8.

Referring to FIG. 9, a file A, a file B and a file C may be stored in the cloud storage. Furthermore, the file A may be contained in the device #1 200-1, and the file B may be contained in the device #2 200-2, and the file C may be contained in the server.

A display of the third device 300 may display a content list contained in the cloud storage. As illustrated in FIG. 9, the user may select a content (file A) among the contents contained in the content list. In this case, the user does not need to recognize whether the content is contained a cloud storage server or contained in a device connected to the cloud storage server. The user may verify using the content list the fact that the content is contained in the cloud storage to send a transmission request.

According to the request, the cloud storage server 500 may check a location where the content is stored. Referring to FIG. 9, the file A is contained in the device #1 200-1, and therefore, the cloud storage server 500 can check that the file A is contained in the device #1 200-1.

Meanwhile, the cloud storage server 500 may check a second device 200-1 in which the content has been stored, and send a transmission instruction request to the second device 200-1, in step S420 of FIG. 8. The transmission instruction request may include data for transmitting the content to the third device 300.

Furthermore, the cloud storage server may notify a device for transmitting the content to the third device 300. For instance, a fact that the content is to be transmitted from the second device 200-1 may be notified to the third device 300 that has requested the content from the cloud storage server.

Meanwhile, the second device 200 may transmit the content corresponding to the received transmission instruction request to the third device 300, in step S430 of FIG. 8. In general, if the second device 200 is able to more efficiently transfer content to the third device 300 than the cloud storage server 500, the third device 300 may receive the content in a more speedy and stable manner from the second device 200 than receiving it from the cloud storage server 500. For example, due to proximity of the second device 200-1 to the third device 300, a direct transfer of content to the third device 300 may be more efficient. It should be appreciated that the content may also be transferred via cloud server 500 rather than being transferred directly from the second device 200-1 to the third device 300. For example, it may be desirable to send the content through the server when NFC is no longer available or when the second device 200-1 has moved out of range from the third device 300.

Figure 10:
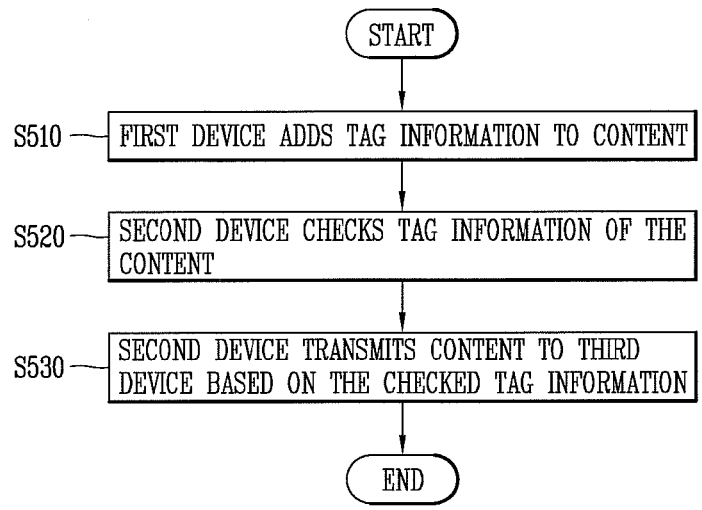
FIG. 10 is a flow chart of a method of transferring content from a first device to a third device based on a tag information according to an embodiment of the present disclosure.

FIG. 10 is a flow chart of a method of transferring content based on a tag information according to an embodiment of the present disclosure. Here, tag information may be added to a content at a first device 100, in step S510. In this case, the tag information may include a target device (e.g., destination device) for the content. The target device is a device to which the content is desired to be transmitted. In other words, using content tag information, a predetermined content may be designated to be transmitted to a predetermined device according to the user's need. Furthermore, the content may be designated to be operated within a predetermined function using the content tag information. Information required for the foregoing operation may be contained in the content tag information.

Figure 11A:
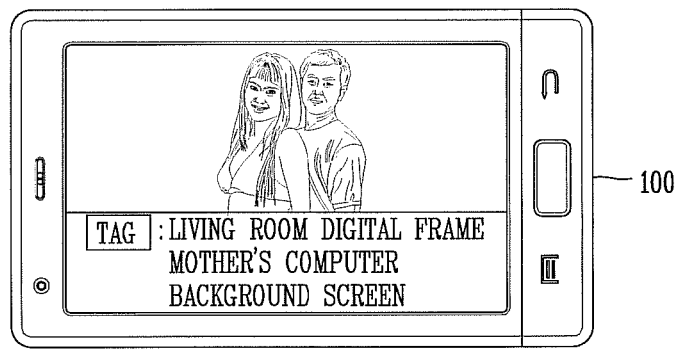
FIGS. 11A and 11B are views illustrating a method of adding information related to a target device to a content.
Figure 11B:
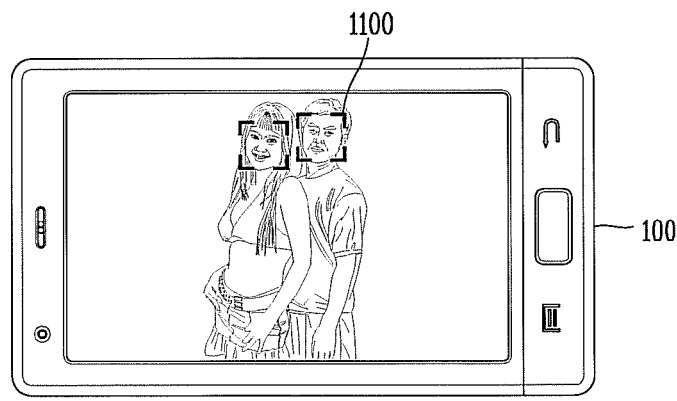

Hereinafter, the method of adding tag information to a content will be described with reference to FIGS. 11A and 11B. FIGS. 11A and 11B are views illustrating a method of adding information on an target device to an arbitrary content. The user may input a target device to tag information within an arbitrary content acquired by the first device. Referring to FIG. 11A, the user inputs a "living room digital picture frame", a "mother's computer background screen" as the target device to the tag information input column of a family picture. In this case, the target device may be a digital picture frame in a living room or a mother's computer.

Otherwise, as illustrated in FIG. 11B, the first device 100 or cloud storage server 500 may recognize information contained in a content to set a target device of the content tag information. For instance, referring to FIG. 11B, facial recognition may be used to determine destination devices (e.g., target device). Here, the image of a person contained in the content may be recognized to set a device associated with the person as the target device. For instance, for a picture that has captured a father or mother, a digital picture frame in a living room associated with the father or mother, the mother's computer among the devices contained in the cloud system may be set as the target device. The target device may be determined based on face recognition in conjunction with a contact list, for example. It should be appreciated that other appropriate methods of determining the recipients of contents may be implemented such as, for example, use of content type, content location, user preference information, or the like, and are within the scope of the present disclosure.

Figure 12:
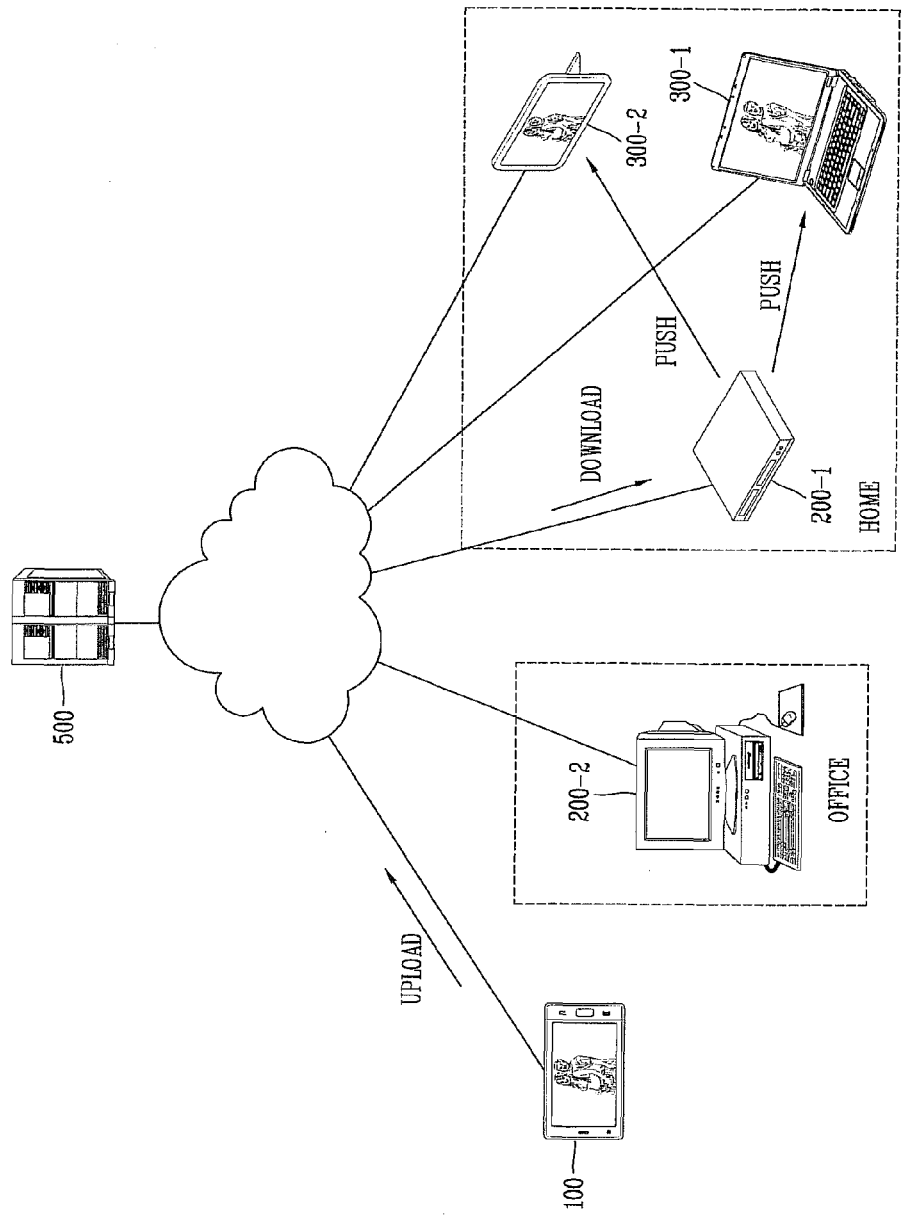
FIG. 12 is a diagram illustrating a method of transmitting content based on tag information from a first device to a third device.

FIG. 12 is a diagram illustrating a method of transmitting a content using tag information from a first device (originating device) to a third device (target device).

The cloud storage server 500 may set content tag information during the step of determining a second device to which the content is to be transmitted. For instance, a device capable of easily performing transmission to a target device may be determined as the second device.

Referring to FIG. 12, it is seen that the second device 200-1 located in the same space as the target device 300-1, 300-2 is determined as a second device 200-1 for storing the content to facilitate content transmission to the target devices 300-1, 300-2. Then, according to the foregoing method, the content can be transmitted to the second device 200-1.

Meanwhile, the second device 200-1 may check the tag information of the content, in step S520, and transmit the content to the third device 300-1, 300-2 based on the checked tag information, in step S530 of FIG. 10.

The controller of the second device 200-1 may check that the device to which the content should be transmitted is a digital picture frame 300-2 in a living room or mother's computer 300-1, in step S520. As a result, the second device 200 can transmit the content to the digital picture frame 300-2 in a living room or mother's computer 300-1, accordingly, in step S530.

Meanwhile, in the device to which the content has been transmitted (e.g., 300-1 and 300-2), the content may be indicated to perform a predetermined function using the content tag information. For instance, when the content is transmitted to a mother's computer, the tag information of the content may include information indicating that it can be used as a background screen of the computer. Accordingly, when the third device 300-1 has received the content, the content can be indicated as a background screen by the tag information of the content.

In one embodiment, the first device 100 may be associated with a first user account and the second device 200-1 and the target device 300-1, 300-2 may be associated with a second user account. Moreover, the first user account and the second user account may be associated with different cloud storage networks. In other words, the first device 100 may transfer content to a device associated with a second user based on the acquired tag information regardless of whether the second user shares the cloud storage service of the first user. Here, the identity of the second user as well as the target device may be determined using facial recognition performed on an image, as previously described. However, in this embodiment, the content may be forwarded to a second cloud storage network associated with the identified user.

In this manner, information for a target device may be included in the tag information of the content, thereby transmitting the content to a device desired by the user. Furthermore, a function performed by the target device may be contained in the tag information of the content, thereby allowing the content to be conveniently used in the target device.

Meanwhile, a content transmission method between two devices using the tag information may be taken into consideration. Here, a device configured to acquire a content and transmit the content to another device may be defined as a transmitting device, and a device configured to receive a content from the transmitting device may be defined as a receiving device.

Figure 13:
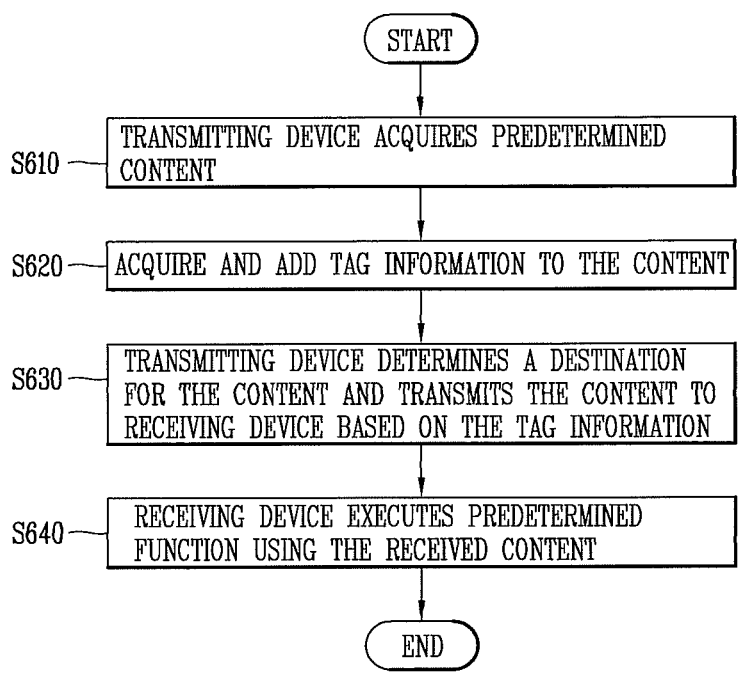
FIG. 13 is a flow chart illustrating a method of transferring content from a transmitting device to a receiving device according to an embodiment of the present disclosure.
Figure 14:
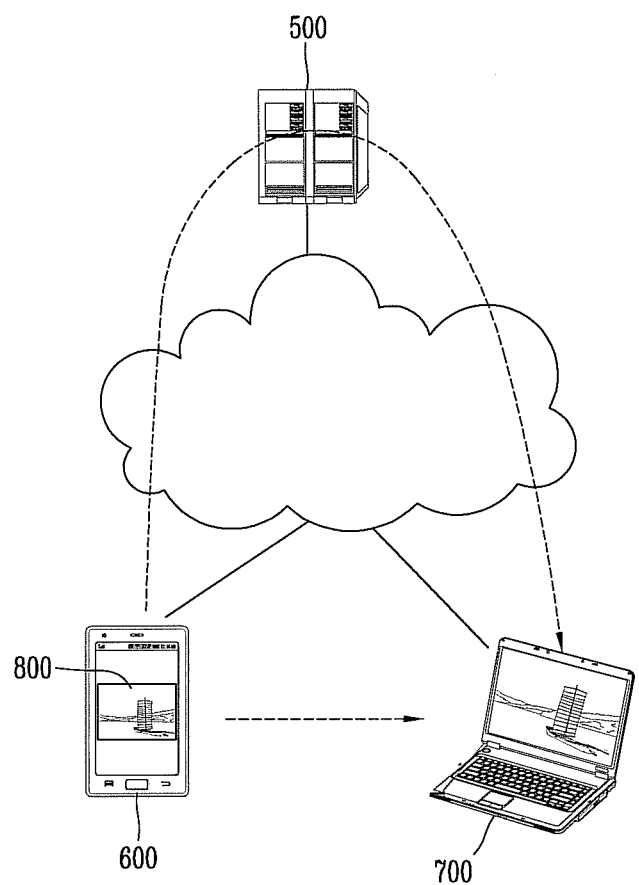
FIG. 14 is a diagram illustrating the method of transferring content from a transmitting device to a receiving device of FIG. 13.

FIG. 13 is a flow chart of a method of transferring content from a transmitting device to a receiving device according to an embodiment of the present disclosure. FIG. 14 is a diagram illustrating the content transmission method to transfer content from a transmitting device to a receiving device of FIG. 13.

A transmitting device 600 may acquire a predetermined content 800, in step S610. For instance, the transmitting device may capture an image to generate a photo image, or the receiving device may receive voice to generate voice data.

The transmitting device 600 may acquire and add tag information to the content 800 based on the foregoing method illustrated in FIG. 11, in step S620. In other words, as described above (refer to FIG. 11), the user can directly input tag information to the tag information input column of a content. Otherwise, the transmitting device may automatically set the tag information of a content based on information contained in the content. The tag information may include information on a receiving device (target device) to which the content is to be transmitted or information on a function to be performed by the receiving device using the content.

The transmitting device 600 may determine the destination for the content and transmit the content to a receiving device 700 based on the information related to the receiving device contained in the tag information, in step S630. For example, if the tag information designated the mother's computer as the target device, the transmitting device 600 may determine an address associated with mother's computer. The address may be stored on a table, on the server, or a contact list or the like may be used to obtain the address for the target device.

In this case, the transmitting device 600 can directly transmit the content to the receiving device 700. For instance, when near field communication, or the like, is enabled between the transmitting device 600 and the receiving device 700, the transmitting device 600 can directly transmit the content 800 to the receiving device 700. Otherwise, the transmitting device 600 may transmit the content to the receiving device 700 by way of another device (e.g., another user device), a server, or the like. For instance, when direct communication is disabled between the transmitting device 600 and the receiving device 700, the content 800 can be transmitted by way of a cloud storage server 500, or the like.

Referring to FIG. 14, it may be possible to check the process of directly transmitting a predetermined content 800 from the transmitting device 600 to the receiving device 700 or transmitting the content 800 from the transmitting device 600 to the receiving device 700 by way of a server 500.

In one embodiment, the transmitting device 600 and the receiving device 700 may be associated with the same cloud storage server 500 on the same cloud storage network or different cloud storage servers on different cloud storage networks. Moreover, the transmitting device 600 and the receiving device 700 may be associated with different user accounts.

Meanwhile, the receiving device 700 may implement a predetermined function based on the received tag information of the content to use the content within the function, in step S640 of FIG. 13. The tag information may include information on a function to be performed by the receiving device using the content. The information on a function may be an instruction to control an operation of the receiving device 700. Accordingly, upon receiving the content having the added tag information, the receiving device can execute the function to be performed.

Then, the receiving device can use the received content when performing the function. For instance, when the tag information of the content 800 contains information indicating that the content is to be used as a background screen in the receiving device, the receiving device 700 can execute the function to set the background. Then, when the receiving device performs the set background function, the received content may be indicated as a background screen. As illustrated in FIG. 14, when information indicating that the content is to be used as a background screen of the computer is contained in the tag information of the transmitted content 800, the receiving device 700 receives the content 800 to use it as a background screen.

In this manner, a receiving device may be added to the tag information of the content, thereby transmitting the content to a device desired by the user. Furthermore, a function to be performed by the receiving device using the content may be contained in the tag information of the content, thereby allowing the content to be conveniently used in the receiving device.

As broadly described and embodied herein, a content transmission method may include acquiring a predetermined content, adding tag information containing information on a receiving device to which the content is transmitted to the content, and transmitting the content to which the tag information is added to at least one of a cloud storage and a receiving device based on the tag information.

In a content transmission method according to another aspect of the present disclosure, the tag information may include information on a function to be executed by the receiving device using the content.

In a content transmission method of a device according to an aspect of the present disclosure, the method may include receiving a content acquired by a transmitting device, and performing a predetermined function based on tag information added to the content, wherein the received content is used when performing the function.

In a content transmission method according to another aspect of the present disclosure, said receiving step may directly receive a content from a transmitting device, or receives a content by way of a cloud storage.

In a content transmission method of a device according to an aspect of the present disclosure, the method may include receiving a content from a first device by participating as a member of a cloud storage server, storing the received content in response to the reception, and transmitting the content to a third device on behalf of the cloud storage server according to a request for the stored content, wherein said storing the content is performed according to the determination of the cloud storage server.

In a content transmission method according to another aspect of the present disclosure, the determination may be performed based on at least one of a user context and content information.

In a content transmission method according to still another aspect of the present disclosure, the user context may include information on at least one of a location of a user device, and a communication state between user devices, and the content information may include at least one of a content format, a content title, content tag information, and content reproduction information.

In a content transmission method according to yet still another aspect of the present disclosure, the determination may be performed based on whether or not content transmission to the third device is enabled.

In a content transmission method according to still yet another aspect of the present disclosure, said receiving step may include directly receiving a content from a first device or receiving a content by way of the server.

In a content transmission method according to yet still another aspect of the present disclosure, the method may further include transmitting the content to the server when the content is directly received from the first device.

In a content transmission method according to still yet another aspect of the present disclosure, the request may be a transmission instruction request of the server based on a transmission request to a server of the third device.

In a content transmission method according to yet still another aspect of the present disclosure, the request may be based on tag information contained in the content.

In a content transmission method according to still yet another aspect of the present disclosure, the tag information may include information for performing a function using the content in the third device.

In a content transmission method according to an aspect of the present disclosure, the method may include acquiring a storage request for an arbitrary content from a first device, determining a second device for storing the content based on at least one of a user context and content information, and transmitting a transmission instruction request to the determined second device when a transmission request for the content is acquired from a third device.

In a content transmission method according to another aspect of the present disclosure, the method may further include receiving the content from the first device.

In a content transmission method according to still another aspect of the present disclosure, the method may further include transmitting the content to the determined second device based on the determination.

In a content transmission method according to yet still another aspect of the present disclosure, said determining a second device may determine a second device based on tag information contained in the content.

In a content transmission method according to still yet another aspect of the present disclosure, said transmitting step may transmit the content to a third device by way of the second device.

In a content transmission method according to yet still another aspect of the present disclosure, the tag information may include information for performing a function using the content in the third device.

In a device participating as a member of a cloud storage server according to an aspect of the present disclosure, the device may include a communication unit configured to receive a content from a first device, a memory configured to store the received content according to the determination of the cloud storage server in response to the reception, and a controller configured to control transmitting the content to a third device on behalf of the cloud storage server according to a request for the stored content.

In a server according to an aspect of the present disclosure, the server may include a communication unit configured to acquire a storage request for an arbitrary content from a first device, and a controller configured to control determining a second device for storing the content based on at least one of a user context and content information, and transmitting a transmission instruction request to the determined second device when a transmission request for the content is acquired from a third device.

As broadly disclosed and embodied herein, a scheme for using the storage space of personal devices on behalf of a cloud server in addition to the capacity provided by the cloud server can be provided to a user. Furthermore, according to a disclosure of the present specification, a scheme for allowing a client to quickly acquire data contained in a cloud storage even when a network state between the client and the server is not so good can be provided to the user. Furthermore, according to a disclosure of the present specification, a scheme for performing an additional function in a personal device when its contents are shared can be provided to the user.

The methods described herein may be implemented in a computer-readable medium using, for example, software, hardware, or some combination thereof. For a hardware implementation, the embodiments described herein may be implemented by using at least one of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, micro processors, and other electronic units designed to perform the functions described herein.

For a software implementation, procedures and functions described herein may be implemented with separate software modules. The software modules can be implemented with software codes written in a suitable programming language. Also, the software codes may be stored in the storage unit and executed by the processor.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method of transferring content between a plurality of devices, the method comprising:
   acquiring content at a first device;
   acquiring tag information associated with the content, the tag information including identification of a target device to which the content is to be transmitted;
   adding the tag information to the content at the first device such that the content is reproduced at the target device;
   determining a second device to which the content is to be stored on behalf of a cloud storage server based on the tag information including identification of the target device and a user context information when a request for storing the content into the cloud storage server is received,
   wherein the user context information comprises at least one of a network state between the second device and the target device, and distance between the second device and the target device;
   transmitting the content to the second device determined based on the tag information and the user context information; and
   wherein the first device and the second devices are associated with different cloud storage networks.

2. The method of claim 1, wherein the first device is associated with a first user account on a first cloud storage network and the second device is associated with a second user account on a second cloud storage network.

3. The method of claim 1, wherein the first device and the second device are associated with the same cloud storage network.

4. The method of claim 1, wherein the second device is identified as the destination device based on facial recognition performed on the captured image.

5. The method of claim 4, wherein the content is an image captured at the first device, and the acquiring tag information associated with the content includes performing facial recognition on the captured image.

6. The method of claim 1, wherein the tag information includes an instruction to perform a prescribed function using the content at the second device.

7. The method of claim 1, wherein determining the second device includes identifying a cloud storage device capable of transferring the content to the second device using near field communications (NFC).

8. A multifunctional display device, comprising:
a communication unit communicatively connected to a cloud storage server;
a memory for storing content; and
a controller configured to transfer content stored in the memory, wherein the controller
  acquires tag information associated with the content, the tag information including identification of a target device to which the content is to be transmitted,
  adds tag information to the content at the first device such that the content is reproduced at the target device,
  determines a second device to which the content is to be stored on behalf of a cloud storage server based on the tag information including identification of the target device and a user context information when a request for storing the content into the cloud storage server is received, and
transfers the content to the second device determined based on the tag information and the user context information,
wherein the first device and the second devices are associated with different cloud storage networks.

9. The device of claim 8, wherein the first device is associated with a first user account on a first cloud storage network and the second device is associated with a second user account on a second cloud storage network.

10. The device of claim 8, wherein the first device and the second device are associated with the same cloud storage network.

11. The device of claim 8, wherein the content is an image captured at the first device, and the acquiring tag information associated with the content includes performing facial recognition on the captured image.

12. The device of claim 11, wherein the second device is identified as the destination device based on the facial recognition performed on the captured image.

13. The device of claim 8, wherein the tag information includes an instruction to perform a prescribed function using the content at the second device.

14. The device of claim 8, wherein the controller identifies a cloud storage device capable of transferring the content to the second device using near field communications (NFC).

* * * * *